United States Patent [19]

Mulcahy

[11] 4,243,363
[45] Jan. 6, 1981

[54] CONTROL OF TUBULAR FILM SIZE

[75] Inventor: John J. Mulcahy, Beverly, Mass.

[73] Assignee: Gloucester Engineering Co., Inc., Gloucester, Mass.

[21] Appl. No.: 19,486

[22] Filed: Mar. 12, 1979

[51] Int. Cl.³ .............................................. B29D 23/04
[52] U.S. Cl. ................................... 425/140; 264/40.2; 425/72 R; 425/172; 425/326.1
[58] Field of Search ................. 425/140, 72 R, 326.1, 425/172; 264/40.2, 569

[56] References Cited
U.S. PATENT DOCUMENTS

| | | | |
|---|---|---|---|
| 3,159,698 | 12/1964 | Suh et al. | 264/210.2 |
| 3,700,370 | 10/1972 | Hearns et al. | 425/140 |
| 3,932,080 | 1/1976 | Uemura et al. | 425/140 |
| 3,980,418 | 9/1976 | Schott, Jr. | 425/72 R |

*Primary Examiner*—Jeffery R. Thurlow

[57] ABSTRACT

A blown-film system, for producing plastic tubing, in which the rate of flow of air, into or out of the tube, is made directly dependent upon the deviation in position of the tube wall and in which stability in tube size is achieved by providing a control system that feeds back both tube circumference and air valve position to drive a valve motor.

11 Claims, 13 Drawing Figures

FIG 7d LARGE

FIG 7c SWAY (OK)

FIG 7b ON ℄ (OK)

FIG 7a SMALL

CONTROL OF TUBULAR FILM SIZE

FIELD OF THE INVENTION

This invention relates to apparatus for controlling the circumference of blown film.

BACKGROUND OF THE INVENTION

Blown-film apparatus is used to manufacture plastic bags and the like. A molten tube of plastic is extruded from an annular die and then stretched and expanded to a larger diameter and a reduced thickness by the action of overhead nip rolls and internal air pressure. Where the film is to be wound in a roll, the annular die or the overhead nip rolls are slowly rotated to distribute film thickness irregularities caused by die imperfections. To control the circumference of the finished tube, it is generally necessary to adjust the volume of air captured inside the tube between the annular die and the overhead nip rolls. It has been conventional to adjust the entrapped volume of air by operating valves in the small inflation line connected to the tube interior. These valves were opened or closed in what is known as "bang-bang" control in response to measurements of tube size. E.g., Uemura et al. U.S. Pat. No. 3,932,080, Suh et al. U.S. Pat. No. 3,159,698, and Hearns et al. U.S. Pat. No. 3,700,370.

To increase production speeds of blown film lines, a continuous stream of cooling air has been admitted through passages in the die, directed against the inner wall of the tube and removed through passages in the die. In such dies, in order to regulate the flow rate in a dynamic manner a mechanical feeler that follows the wall of the tube has been used. Schott U.S. Pat. No. 3,980,418, for instance, shows a single feeler mechanically connected to a pneumatic regulator valve which, through a pneumatic cylinder, proportionally controls a flapper valve in the internal air supply line.

The copending application of Schott, Ser. No. 964,983, filed Nov. 30, 1978, entitled "Optical Control of Tubular Film Size," discloses an optical control system for varying the flow of internal cooling air to maintain tube circumference. An electrical signal representative of changes in tube circumference from a set point is generated by one or more optical sensors. The electrical signal controls the position of a valve which, in turn, determines the rate of cooling air flow.

SUMMARY OF THE INVENTION

In controlling the flow rate of air entering or leaving a blown-film tube by feeding back an electrical signal representative of deviation in tube circumference, e.g., in the manner suggested by Schott in Ser. No. 964,983, I have found that a severe instability in tube size can result and that the principle cause of this is the presence of two integrator relationships in the control loop. The volume and circumference change of the tube is the integral of flow rate change over time, and the position of the air flow control valve at any time is the integral of the electrical signal applied to the actuator for moving the valve. Furthermore, I have found that other potential causes of instability include a standing-wave resonance of the tube, the vertical location of the circumference sensors with respect to the frost line, a flutter resonance of the tube caused by the exterior cooling air, and a cutoff frequency (or lag) of the actuator.

In spite of these tendencies toward instability, I have found that adequately fast correction of deviations in tube circumference can be made. My invention features feeding back a valve-position signal generated by a valve-position sensing means (e.g., an angular sensor on the shaft of a valve) to processing means (e.g., a summing amplifier) that is responsive to the difference between the valve-position signal and the signal representative of deviation in tube circumference and generating an error signal that is dependent on this difference and which, via driving means, controls the actuator that moves the valve.

In preferred embodiments, second processing means treats the circumference-deviation signal and includes a low-pass filter with a cutoff frequency that is less (e.g., half) than the flutter resonant frequency; the frequency at which the total open-loop gain of the apparatus is unity is below (e.g., two-thirds) the standing-wave resonant frequency of the tube; the frequency at which the total open-loop gain of the inner loop is unity is above the standing-wave resonant frequency of the tube and below the flutter and actuator cutoff frequencies.

PREFERRED EMBODIMENT

The structure and operation of a preferred embodiment of the invention will now be described, after first briefly describing the drawings.

STRUCTURE

Figure 1:
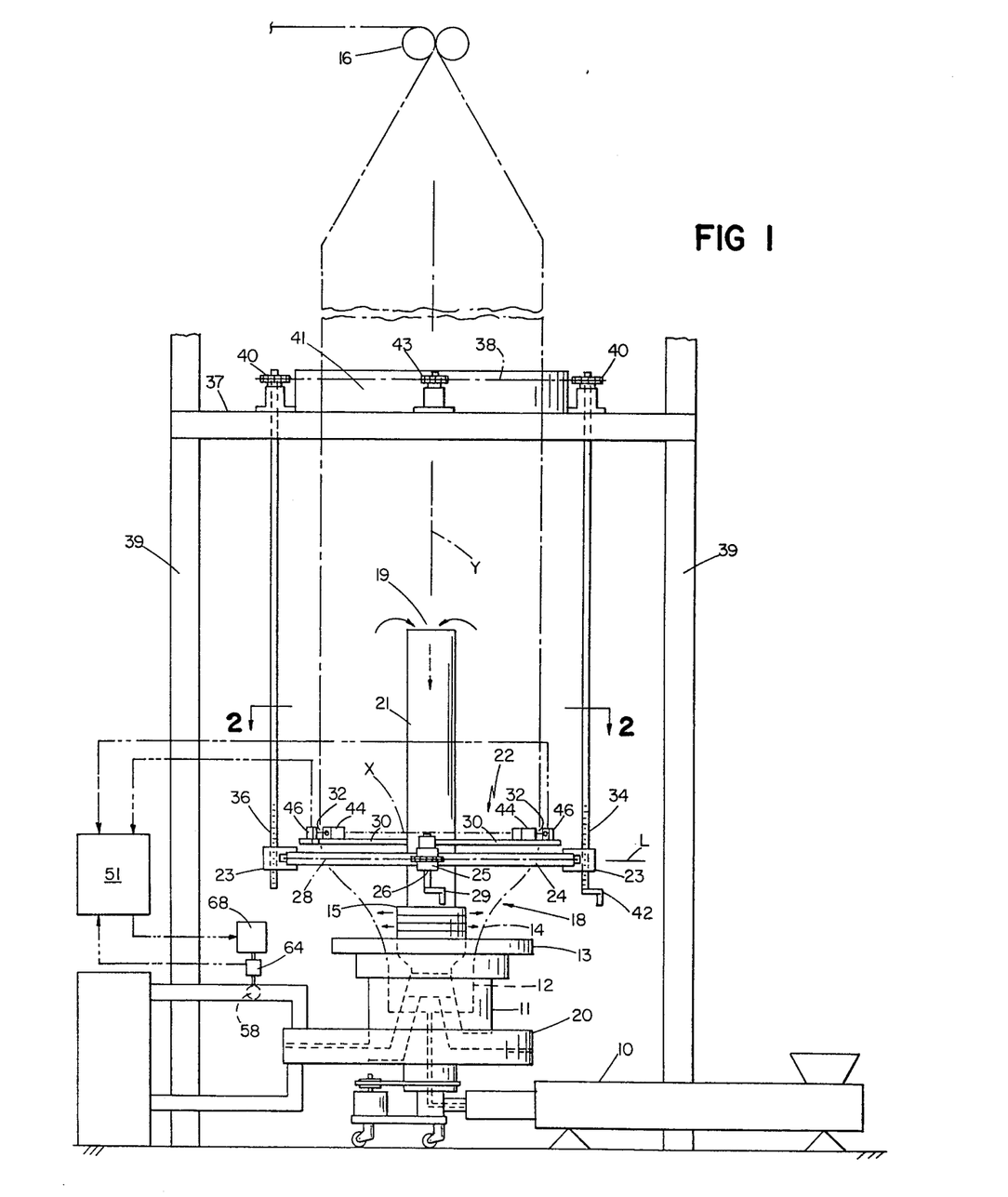
FIG. 1 is a diagrammatic elevation view of internally-cooled blown-film apparatus employing the tube circumference control apparatus of the invention.

Referring to FIG. 1, there is shown apparatus for producing blown film, such as for high quality plastic bags or sheeting. Plastic granules fed into a hopper are melted internally and fed by extruder 10 to the die where the plastic emerges from the annular die orifice 12 as a molten plastic tube 14. The tube is drawn upwardly by nip rolls 16, which stretch and flatten it. Other rolls transport the flattened tube to a storage roll (not shown). To evenly distribute circumferential irregularities in the thickness of the tube wall, caused by irregularities in die orifice 12, the die 11 is slowly rotated (about 1 rpm) about vertical axis Y.

Figure 9:
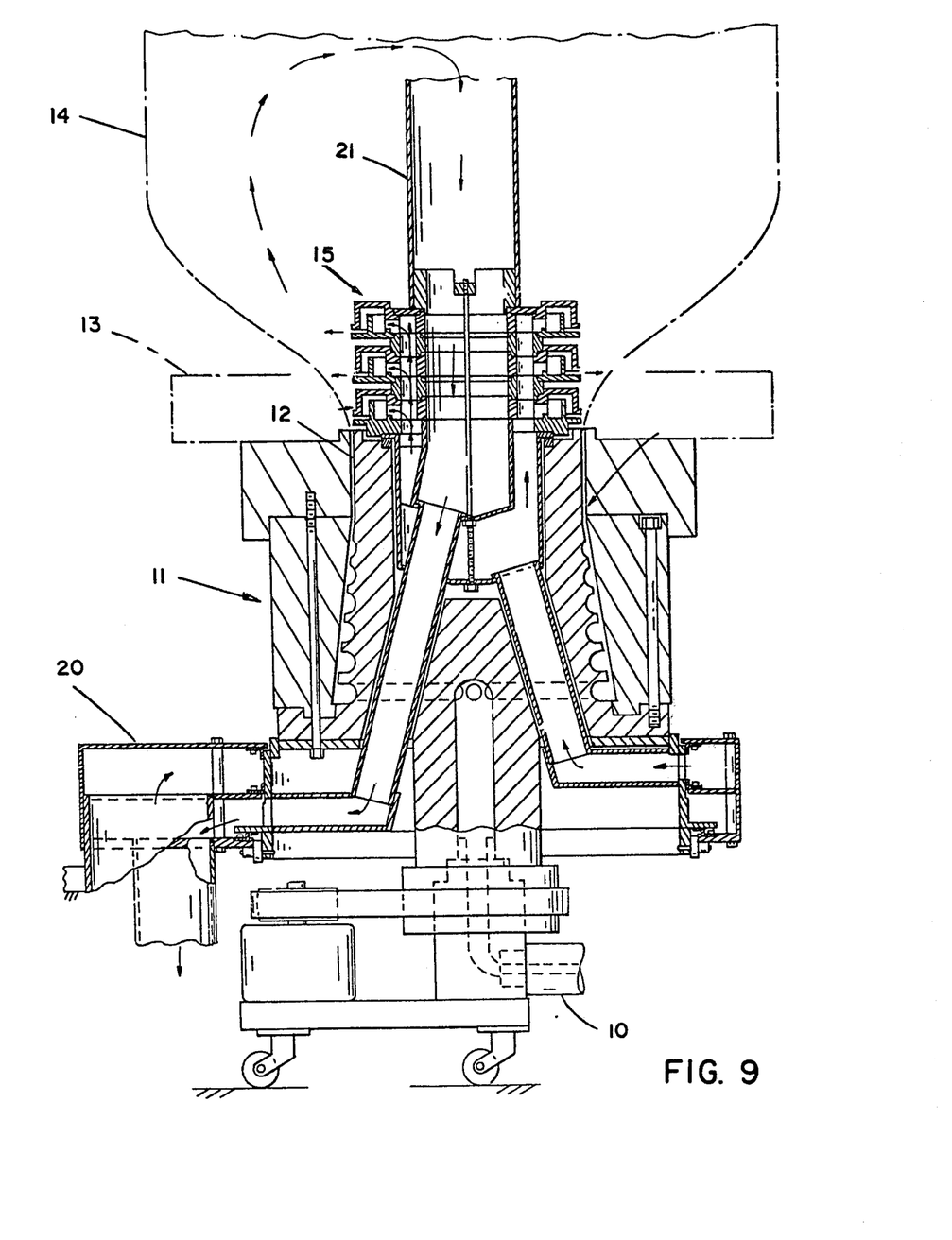
FIG. 9 is a vertical cross-section on an enlarged scale of the extrusion die with internal bubble cooling shown in FIG. 1.

After the tube emerges from die orifice 12, and while it is still molten, it expands in region 18 from the die diameter (e.g., 12 inches) to the desired final diameter, which may vary typically between 2 and 3 times the orifice diameter. Both external and internal cooling air rings 13, 15 direct cool flowing air against the tube in expansion region 18. Internal cooling air is introduced to internal air ring 15 through passages in the die. Spent, warmed air is withdrawn through plenum 20, outlet 19 and pipe 21, and exits via passages in the die. The air passages through the die are shown in more detail in FIG. 9, and are described in more detail in copending U.S. application Ser. No. 610,631, filed Sept. 5, 1975 and entitled INTERNAL AIR COOLING OF TUBULAR PLASTIC FILM now issued as U.S. Pat. No. 3,980,418. The tube is solidifed at the so called frost line at level L, and has nearly reached its final diameter there.

Control over the final diameter of the tube is achieved by varying the flow rate at which internal cooling air is supplied. Greater rates of flow produce higher internal pressures and higher captured volume of air within the tube, thereby more greatly expanding the tube. The draw rate of nip rolls 16 also influences the shape of the expansion region 18, tending to raise or lower level L.

The final diameter is measured by two diametrically opposed optical sensor assemblies 22 (FIG. 2), positioned just above level L where the final diameter is first reached. Sensor assemblies 22 are supported on curved sensor arms 30 which pivot from lower ring 24. The lower ring in this embodiment is hung on support shafts 34, 36 from overhead platform 37 which rests on posts 39. In retrofit situations such an overhead platform may already exist.

Figures 2, 3, 6:
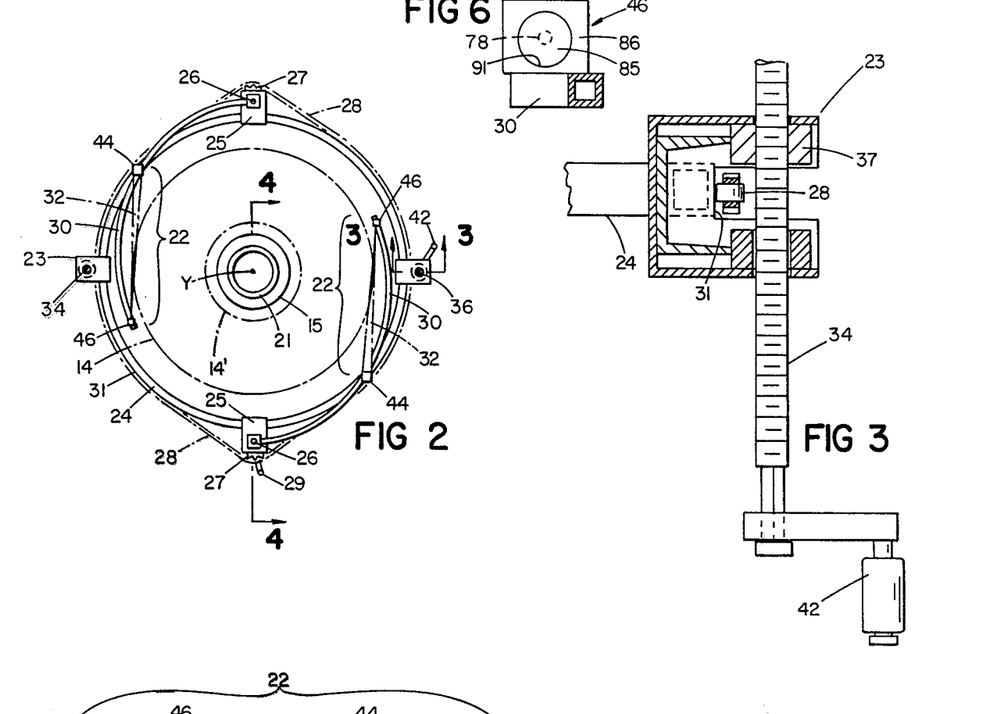
FIG. 2 is a horizontal cross-sectional view at 2—2 in FIG. 1, showing the tube wall position sensors.
FIG. 3 is a vertical cross-sectional view at 3—3 in FIG. 2, showing the height adjustment mechanism.
FIG. 6 is a vertical section view at 6—6 in FIG. 4, showing the detector.

Vertical adjustment of lower ring 24 and the sensor arms 30 carried thereon is provided by rotation of handle 42 fastened to shaft 34 (FIGS. 1, 3). Rotation of handle 42 turns both shafts 34 and 36 in unison, and threads on the lower ends of both shafts engage threaded portions of feed blocks 23 fastened to lower ring 24, thereby raising and lowering the ring. Shafts 34, 36 turn in unison because sprockets 40 fixed to both shafts at their upper ends are coupled by upper chain 38 extending circumferentially around overhead platform 37. Additional idler sprockets 43 on upper ring 41 guide upper chain 38.

Figures 4, 5:
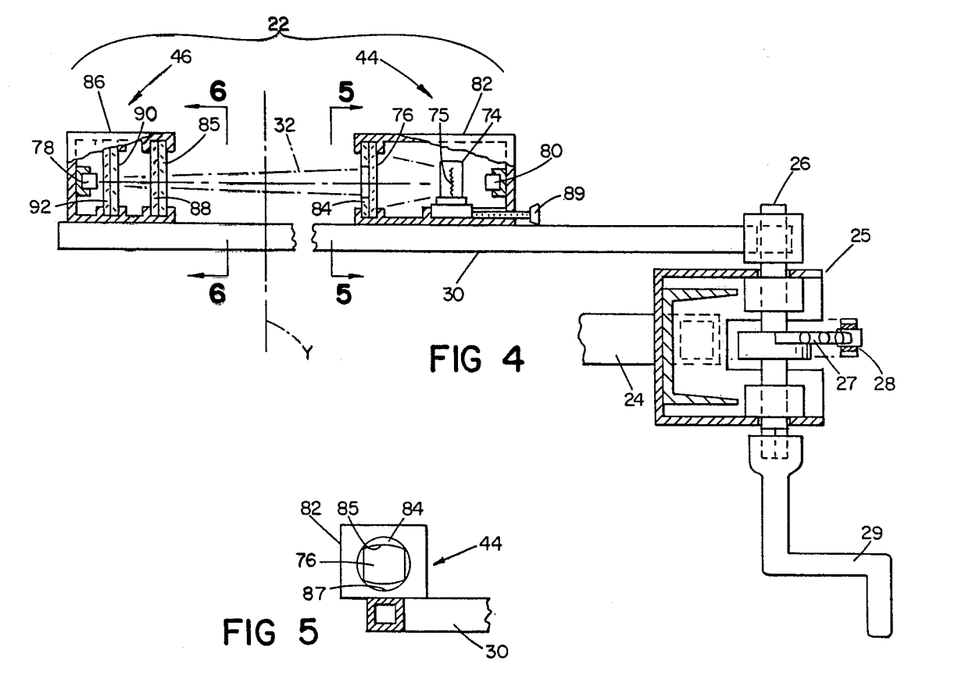
FIG. 4 is a vertical cross-sectional view at 4—4 in FIG. 2 showing the transmitter and detector of one sensor, and the sensor arm and associated arm rotation mechanism.
FIG. 5 is a vertical section view at 5—5 in FIG. 4, showing the transmitter.
Figure 7A:
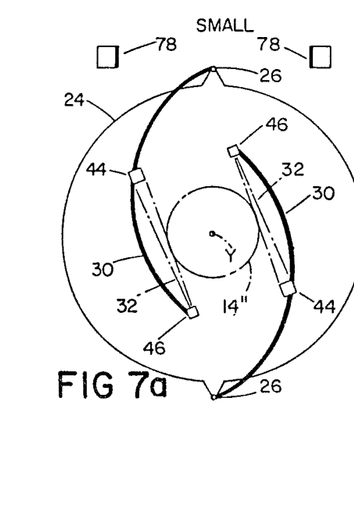
FIGS. 7a, 7b, 7c and 7d are diagrammatic plan views of the sensors for four different tube conditions, illustrating, by the shading in the small squares, the fraction of the relatively wide optical beam occluded in each of the conditions.
Figure 7B:
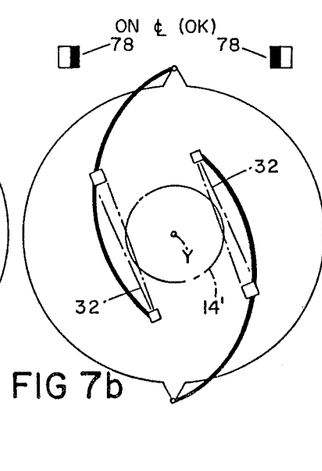
Figure 7C:
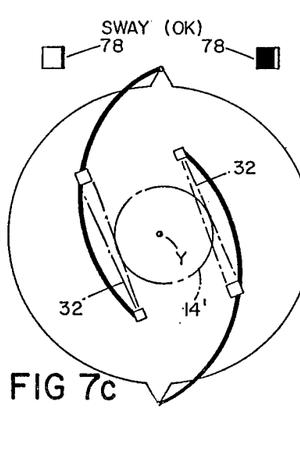
Figure 7D:
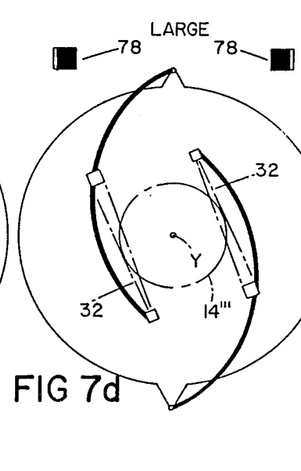

Referring to FIG. 2, there is mounted on each sensor arm 30 a wide beam transmitter 44 and a detector 46, which send and receive light beams 32. The arms are coupled together by lower chain 28 which engages sprocket elements 27 fastened to each sensor arm 30 at pivot shafts 26 (FIG. 4). The shafts are supported by bearings in blocks 24 fastened to lower ring 24. Lower chain 28 is guided at locations spaced 90 degrees from shafts 26 by bearing surfaces 31 of the frame (FIG. 3). Rotation of handle 29 fastened to one of pivot shafts 26 causes sensor arms 30 to rotate in unison toward or away from the tube.

Referring to FIGS. 4 and 5, each transmitter 44 consists of housing 82 containing incandescent bulb 74 with a single vertical filament 75 parallel to vertical axis Y of the tube and also to the tube walls. Filament 75 is located at the focus of Fresnel lens 76. Mask plate 84 with specially-shaped aperture 84 abuts lens 76, and both are supported behind round aperture 87 in the front face of housing 82 (FIG. 5). Photocell 80 is positioned on the backwall of housing 82 to measure the light intensity of bulb 74 and, with control circuitry (not shown), maintain the intensity at a constant value. Screw 89 is used to adjust the position of bulb 74. Bulb 74 is operated at half its rated power to increase life and reliability. The interior of housing 82 has a light-absorbing coating to assure that no light is reflected from the interior walls toward Fresnel lens 76.

Referring to FIGS. 4 and 6, detector 46 consists of housing 86 containing photocell 78 (Optical Coating Labs P/N 110PL-1; 0.375 inch square passivated silicon photo diode) mounted at the backwall. Window 85 with infrared filter 88 mounted behind it are positioned behind aperture 91 in housing 86. Spaced behind the window and filter and in front of photocell 78, are diffuser plate 90 and polarized filter 92. The interior of housing 86 has a light-absorbing coating to eliminate internal reflection.

Figure 8:
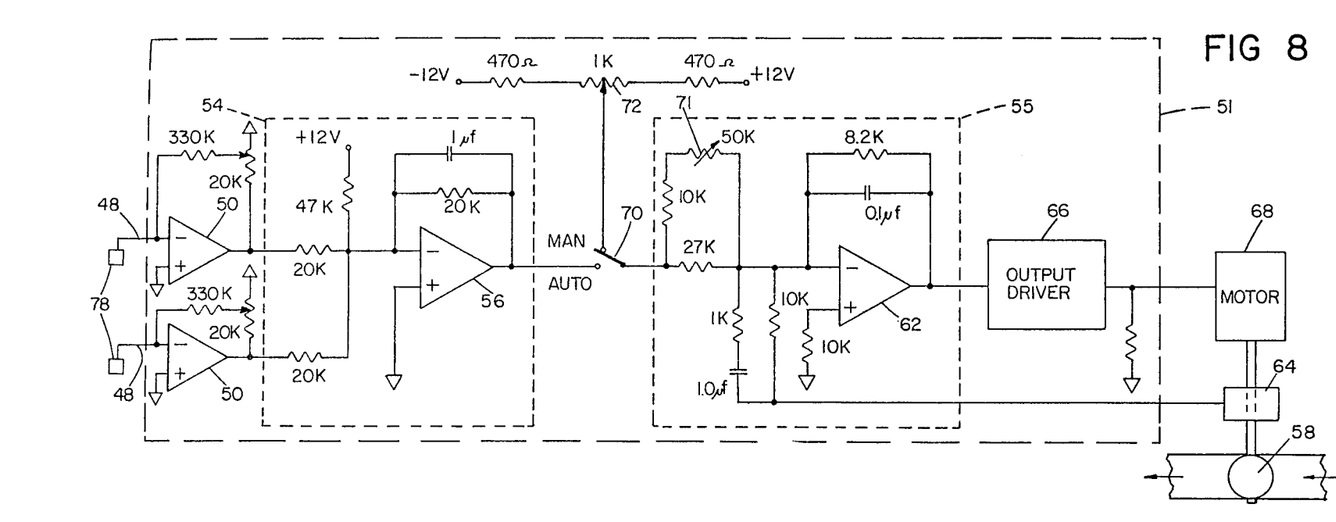
FIG. 8 is a schematic view of the circuitry of the control apparatus.

Referring to FIGS. 1 and 8, the electrical outputs of detectors 46 are connected to control box 51 where they are applied to inputs 48 of amplifiers 50 and the output of amplifiers 50 are summed and filtered by amplifier 54. Switch 70 connects either the filtered photocell output or the output of manually adjustable potentiometer 72 to amplifier 55, which compares the selected output with a valve position feedback signal from valve sensor 64 (Pickering RVDT P/N 23330). The error signal generated by amplifier 55 is further amplified by power amplifier 66, the output of which drives valve motor 68 (Electrocraft E-660), which in turn, drives circular flapper valve 58 in the air supply line to internal cooling ring 15. Amplifiers 56 and 62 are operational amplifiers. Resistor and capacitor values are as shown in FIG. 8.

Figure 10:
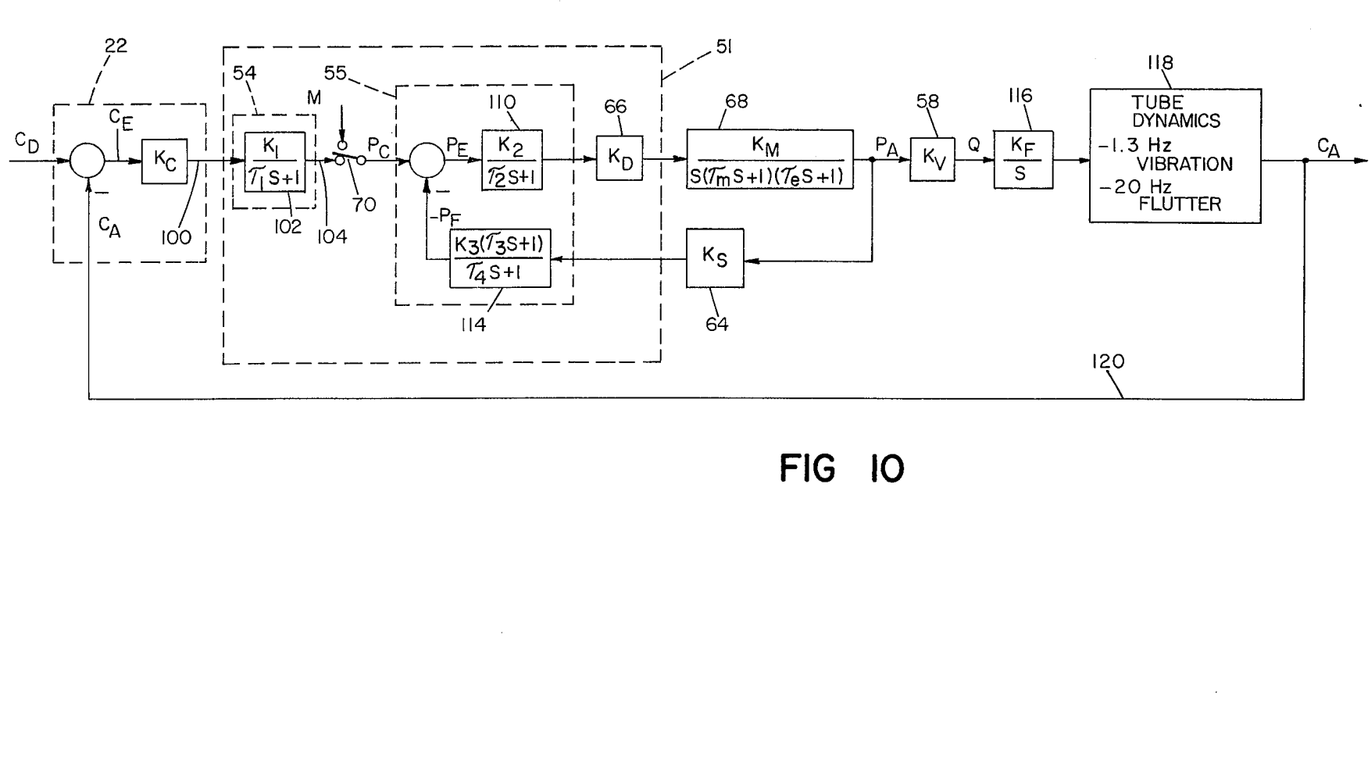
FIG. 10 is a block diagram of the control system, with the control apparatus and the blown-film apparatus being represented by functional blocks.

Referring to FIG. 10, there is shown a block diagram of the control system. Sensors 22 detect the error in circumference $C_E$ by computing the difference between the desired circumference $C_D$ (the position of sensor arms 30 setting $C_D$) and the actual circumference $C_A$ of the tubular film. The sensors also introduce a gain $K_C$ (5 v/in). (To simplify the block diagram, sensors 22 are shown as a single subtractor and block, and amplifier circuitry in the control apparatus for combining the outputs of the two sensors is deleted.) Output 100 of the sensors is processed by low-pass filter 102 with gain $K_1$ (1.0 v/v) and time constant $\tau_1$ ($1/\tau_1 = 50$ rad/sec) (implemented by amplifier 54). Switch 70 selects as valve position command signal $P_C$ either output 104 of the filter or a manual input signal M. Amplifier 55 computes the difference between command signal $P_C$ and valve position feedback signal $P_F$. This difference, or error signal $P_E$, is processed by low-pass filter 110 with gain $K_2$ (0.15 v/v) and time constant $\tau_2$ ($1/\tau_2 = 1200$ rad/sec). Output driver 66 (a driving means) with gain $K_D$ (10 v/v) converts the output of filter 110 into an electrical signal suitable for driving motor 68.

Motor 68 ($K_M = 3.3$ rad/volt-sec) behaves as an integrator in translating the electrical output of driver 66 into actual valve position $P_A$ (rad). This results because the angular speed of the motor is proportional to its electrical input, and valve position is the integral of the motor's angular speed. High frequency response of the motor is governed by two first-order lags with time constants $\tau_m$ and $\tau_e$. The mechanical lag resulting from the rotational inertia and damping of the motor and its load is modeled as having a cutoff frequency of $1/\tau_m = 100$ rad/sec. The motor's inductance gives a cutoff frequency of $1/\tau_e = 280$ rad/sec.

Valve position sensor 64 with gain $K_S$ (3.1 v/rad) converts actual valve position $P_A$ into an electrical feedback signal which is then processed by lead-lag compensation filter 114 (a part of amplifier 55) to form the valve position feedback signal $P_F$. The compensation filter has a lead time constant $\tau_3$ equal to $\tau_m$, thereby extending the frequency response of the motor by cancelling its first cutoff frequency $1/\tau_m$. This allows increased inner loop gain and thus increased accuracy while retaining stability. The lag cutoff frequency $1/\tau_4$ of the compensation filter is 1000 rad/sec.

The remaining blocks of FIG. 10 describe the dynamics of the tube and the air flow supplied to it. The action of valve 58 is approximated by a constant gain $K_V$ between valve position $P_A$ and cooling air flow Q.

The relationship between air flow Q into the film tube and actual circumference $C_A$ of the tube can be approximated by blocks 116, 118. Block 116 is an integrator with gain $K_F$, and represents the relationship between flow rate and change in tube circumference. The integrator relationship results because the circumference of the tube is roughly proportional to the volume of air entrapped inside the tube, and the entrapped air volume is dependent on the integral of the air flow rate entering the tube. Block 118 describes further dynamics of the tube, which include a 1.3 Hz standing-wave resonance and a roughly 20 Hz flutter oscillation. The block diagram is completed by feedback loop 120 which connects actual circumference $C_A$ to sensors 22. The combined gain $K_V K_F$ is 12 in/sec/rad.

OPERATION

In operation, the circumference of tube 14 is maintained with a small tolerance of the desired value by adjusting the flow rate of air to the interior of the tube in proportion to the sensed deviation in circumference. Flow rate is adjusted by rotating flapper valve 58. The valve's normal angular excursion is plus or minus 30 degrees from a normal 30 degree inclination to the flow. Small angular deflections are all that is normally required after the system automatically settles to the set point value. For example, a 0.10 inch change in tube diameter causes an initial angular deflection of about 2 degrees, which changes the nominal flow rate of 600 cfm by about 8 cfm. After a short period (a few seconds), this angular deflection decays to zero, returning the valve to its initial setting of 30 degrees inclination.

To begin operation of the blown-film apparatus, the nominal diameter of the tube is set, with switch 70 in the manual position, by setting the position of sensor arms 30 such that the perpendicular distance between centers of beams 32 is the desired tube diameter. Then the flow output of the air blower (not shown) is adjusted such that, with valve 58 in its normal 30 degree inclination, roughly the correct flow is delivered to the tube interior to produce the desired tube size. Potentiometer 72 can be used in place of sensors 22 to adjust valve 58 and in turn tube size.

Automatic control of tube size is begun by moving switch 70 to the automatic position. An error in tube circumference as measured by sensors 22 generates at the input to amplifier 55 a valve position command signal. This signal is translated into corrective movement of flapper valve 58 by action of amplifier 55, output driver 66, valve motor 68, and feedback from sensor 64. Air flow is thereby automatically increased or reduced in proportion to the sensed error in tube circumference.

Changes in tube circumference are measured by processing the outputs of sensors 22. Each sensor measures the position of that portion of the wall of the tube intersected by one of beams 32. The position measurement is made by sensing the amount of light reaching detector 46. If undisturbed, each wall portion will occlude approximately 50% of each of wide beams 32. Radially inward movement of the wall exposes more of the beam to detector 46; outward movement occludes more of the beam.

As illustrated in FIG. 4, light beams 32 taper down in width from 2.5 inches at transmitters 44 to ⅜ inch at detectors 46, and the beams are quite wide, being 1.25 inches wide at their intersection with the tube walls, so as to accommodate a deviation in tube wall position of 1.25 inches.

As illustrated in FIG. 7, by measuring tube circumference by computing the sum of the optically derived outputs of detectors 46, the measurement is made independent of sway of the tube. FIG. 7a illustrates the condition when the tube circumference is too small; both detectors see greater than 50% of beam 32, and the sum is greater than 100%; and an increase in air flow is signalled. In FIG. 7b, the tube circumference is correct and there is no sway; both detectors see 50% of beam 32, and the sum is 100%. In FIG. 7c, the tube circumference is also correct but the tube exhibits rightward sway; the left detector sees greater than 50% of beam 32 and the right detector less than 50%, but the sum remains 100%, and no increase or decrease of air is signalled. Finally, in FIG. 7d, the tube circumference is too large, and both detectors see less than 50% of the beam making the sum less than 100%, signalling less air. To achieve independence from sway in the circumference measurement using this summing technique, the outputs of detectors 46 (or an electrically processed version of the outputs) are made substantially linearly proportional to the deviation in position of each wall portion.

In order to achieve this linearity (without electrical processing), beams 32 are given uniform energy at each increment (or vertical slide) along their horizontal width. This widthwise uniformity is achieved by giving a curved shape to aperture 85 in mask plate 84 of each transmitter 44 so as to compensate for the natural horizontal nonlinearity in energy produced by bulb 74 and Fresnel lens 76. If a perfect lens (Fresnel or other type) and proper focal distances are used, the curved shape would be that of an hourglass, less beam height in the center than at the edges. This shape simply corrects for the well-known cosine squared fall off in light intensity towards the edges of a lens. With the particular Fresnel lens selected for this embodiment, the light intensity increases towards the edges, and a barrel-shaped aperture shown in FIG. 5 is employed.

To make the circumference measurement also independent of sway in the beam direction, the beam tapers of the two parallel-axis, tapered beams are pointed in opposite directions, so that if one beam is occluded more to such sway, the other beam is occluded lens. Thus sway in the direction of the beams does not change the aggregate percentage occlusion.

The difference between the deviations in position of the two diametrically opposed wall portions gives the change in tube diameter, which change, for a circular cross section, is proportional to the circumference. (The same is also true for non-circular cross sections if their overall shape remains the same as their size changes). The difference between deviations is computed in this embodiment by forming the analog sum of the outputs of detectors 46. The sum provides the difference because of the polarity of the detectors, each producing a larger signal for radially inward movement of the respective wall portion. The sum is computed in analog manner by amplifier 54.

The light beams 32 enter each detector 46 through window 85 and infrared filter 88. The filter screens out infrared light, and thereby makes the tube appear more opaque because it tends to be more transmissive of infrared light. Before striking photocell 78, the beam passes through diffuser plate 90 and polarized filter 92. Diffuser plate 90 spreads the received beam across the full receiving face of photocell 78 to provide maximum response to changes in received light. Polarized filter 92 screens out light of the polarization that is transmitted by the tube. Thus the polarized filter, like the infrared filter, also makes the tube appear more opaque.

The electrical outputs of photocells 78 are fed through the feedback control circuitry of FIG. 8 to produce changes in internal air flow to make corrections in tube diameter. Summer 52 sums the two photocell outputs after they are amplified by amplifiers 50, and 12 volts is added to the summed signal to produce a difference signal which is representative of the deviation from correct tube circumference (i.e., the difference signal is equal to zero when the sum of the transmission percentages received at detectors 46 is 100%). The difference signal is put through a first order low-pass filter (about 8 Hz. break frequency) at amplifier 54 to filter out a 20 Hz. characteristic flutter vibration in the tube wall position caused by the external cooling air flow. The filtered difference signal (or the output of manually-adjustable potentiometer 72) is connected to amplifier 55 by switch 70.

The input to amplifier 55 acts as a valve position command signal, and is translated into rotation of flapper valve 58 by amplifier 55, power amplifier 66, motor 68 and a valve position feedback signal from sensor 64. The difference, or error signal, between the command and feedback signals drives power amplifier 66, which in turn drives valve position motor 68.

In automatically controlling the flow of internal cooling air by the system just described, the inner loop feeding back valve position is the key to providing a stable tube diameter. the inner feedback loop eliminates the integrator relationship between the signal applied to the motor and valve position.

The inner loop gains and compensation are selected to give an open loop unity gain (0 dB) at about 10 Hz (65 rad/sec). This makes the closed-loop bandwidth of the inner loop (3 dB attenuation) also 10 Hz, which is high enough not to slow response of the outer loop control of tube circumference. Further, such an open-loop gain is low enough to prevent the actuator lags ($\tau_m$ and $\tau_e$) from causing instability. The gains $K_2$ or $K_D$ are adjusted to give the desired open loop gain. The inverse of the product of $K_3$ and $K_S$ (0.08 rad/v) sets the closed loop gain or scale factor between valve position and command signal $P_c$.

With the inner loop response determined, the outer loop gain is set to give a bandwidth (and open loop unity gain) of about 0.6 Hz. The bandwidth is selected so as to be about 50% of the standing-wave resonant frequency of the tube, to assure a wide margin of stability while also providing adequately fast response to accurately maintain the desired tube circumference. Faster response can be had by increasing the outer loop gain (by adjusting potentiometer 71), but this reduces the stability margin. The resonant frequency (a standing wave in the film) was found to be 1.3 Hz for a 20 ft. long, 3 ft. wide, 1 mil thick tube operating under 0.03 lb/in-mil tension.

With the inner loop feedback of valve position, the system is stable, meaning that a slight disturbance does not generate a growing oscillation.

Without the inner loop, an unstable oscillation can occur due to phase shifts introduced by the two integrators, the valve motor and the flow integration, and due to the inherent negative feedback of the actual tube circumference. In the absence of the inner loop, the effect would be that an initial oscillation anywhere in the outer loop would immediately be amplified by signals in phase with it coming around the loop. Because the outer loop gain is greater than one for effective control of tube size, such an initial disturbance would build on itself to produce a severe variation in tube circumference.

Stability is also dependent on the vertical location of sensor assemblies 22 with respect to the frost line. If positioned too far above the frost line, delay is introduced because of the time it takes for changes in tube circumference made at the frost line to travel upward to the sensors. The delay contributes phase shift just as do the integrator relationships of the valve motor and flow integration.

On the other hand, sensor assemblies 22 should not ordinarily be positioned below the frost line in the frustoconical region because changes in the shape of this region (e.g., a steepening of the cone angle) can be misinterpreted as changes in tube circumference. Furthermore, the frost line often moves vertically during operation. With these circumferences in mind, a compromise is to locate the sensors at or slightly above the frost line.

OTHER EMBODIMENTS

Other embodiments of the invention will occur to those skilled in the art. For example, less than or more than two sensor assemblies could be positioned around the periphery of tube 14. With less than two sensors, sway would influence the measurement of circumference. Using more than two sensors would, however, better accommodate a situation where the tube takes on a non-circular cross section but retains the same circumference. No air flow correction would be desired in this situation as the width of the flattened tube would not have varied. A further example of possible variations would be to substitute other types of optical sensors, including laser scanners instead of the preferred transmitters.

The overhead support shown in FIG. 1 would preferably be eliminated unless such a support frame already exists on the apparatus. The overhead arrangement would be replaced by support structure resting on external air ring 13 or on the cart supporting the air ring.

Further, the invention could be applied to controlling the circumference of noninternally-cooled blown film whenever the actuator (e.g., a motor) used to control the air flow introduces an integrator in the control loop.

What is claimed is:

1. In apparatus for maintaining a desired circumference of a longitudinally extending thin-wall expanded plastic tube being extruded from an annular die, comprising means for producing a flow of air to establish the volume of the tube, a flow control means to adjust the flow rate of said air, an actuator for said flow control means and control apparatus for said actuator, said control apparatus including at least one tube wall position sensor for producing a circumference-deviation signal dependent upon the deviation in tube circumference from a desired set point, the improvement wherein said control apparatus comprises:

valve position sensing means responsive to changes in actual position of said flow control means for generating a valve position signal that is dependent upon said actual position;

processing means responsive to said circumference-deviation and valve-position signals for generating an error signal dependent upon the difference between said signals;

driving means responsive to said error signal for generating a control signal for driving said actuator, said sensing means, processing means, driving means, and actuator thereby defining an inner feedback loop that feeds back valve position to said processing means, whereby the presence of said inner loop permits said control apparatus to rapidly and stably correct deviations in the circumference of said tube.

2. The apparatus of claim 1 wherein said apparatus is constructed to produce a continuous input of cooling air to the interior of said tube and a continuous exhaust of warmed air from said interior, the volume of air within the tube being dependent on the difference in flow rate between the input and exhaust flow rates and said flow control means includes means to control said difference in flow rate.

3. The apparatus of claim 1 further comprising second processing means responsive to said circumference-deviation signal for supplying a signal to said first-mentioned processing means, the gains of said first and second processing means being selected such that the frequency at which the total open-loop gain of said apparatus is unity is sufficiently below the standing-wave resonance of said tube to establish stability.

4. The apparatus of claim 3 wherein said frequency at which open-loop gain is unity is less than about two-thirds said standing-wave resonant frequency.

5. The apparatus of claim 3 wherein said second processing means includes a low-pass filter having a predetermined cutoff frequency below the flutter resonant frequency of said tube.

6. The apparatus of claim 5 wherein said cutoff frequency is less than about one-half said flutter frequency.

7. The apparatus of claim 1 or 5 wherein said actuator has a cutoff frequency and the frequency at which the total open-loop gain of said inner feedback loop is unity is sufficiently low with respect to said cutoff frequency to establish stability.

8. The apparatus of claim 7 wherein said first processing means includes compensating means for extending the effective cutoff frequency of said actuator.

9. The apparatus of claim 8 wherein said compensating means includes a lead-lag filter with the time constant of the lead selected to correspond to the uncompensated cutoff frequency of the actuator and the time constant of the lag selected to be smaller than said lead time constant.

10. The apparatus of claim 7 wherein said frequency of unity open-loop gain for said inner loop is less than the flutter resonant frequency and greater than the standing-wave resonance of said tube.

11. The apparatus of claim 10 wherein said actuator includes a motor that rotates a shaft connected to said valve, the rate of rotation being dependent on the amplitude of said control signal, and said position sensing means includes an angular position sensor that is responsive to the angular position of said shaft for generating said valve-position signal.

* * * * *